(12) United States Patent
Bekki (10) Patent No.: US 8,444,187 B2
(45) Date of Patent: May 21, 2013

(54) SEPARATION PREVENTION DEVICE FOR PIPE JOINT

(75) Inventor: Hiroyuki Bekki, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 13/535,220

(22) Filed: Jun. 27, 2012

(65) Prior Publication Data

US 2012/0267889 A1 Oct. 25, 2012

Related U.S. Application Data

(63) Continuation of application No. 12/663,632, filed as application No. PCT/JP2008/056539 on Apr. 2, 2008.

(30) Foreign Application Priority Data

Jun. 12, 2007 (JP) .................................. 2007-155315

(51) Int. Cl.
*F16L 19/06* (2006.01)

(52) U.S. Cl.
USPC ........... 285/343; 285/342; 285/339; 285/323; 285/421; 29/446; 29/525.01

(58) Field of Classification Search
USPC ................ 285/342, 343, 339, 337, 255, 243, 285/245, 249, 322, 323, 324, 421; 29/446, 29/525.01
See application file for complete search history.

(56) References Cited

U.S. PATENT DOCUMENTS

| 2,440,178 A | 4/1948 | Lofquist, Jr. |
| 2,460,653 A | 2/1949 | Raybould |
| 3,148,902 A | 9/1964 | Gardner, Sr. et al. |
| 3,189,962 A | 6/1965 | Hartwell |
| 3,679,239 A | 7/1972 | Schmitt |
| 4,498,691 A | 2/1985 | Cooke |
| 5,165,735 A | 11/1992 | Nardi et al. |
| 5,188,401 A | 2/1993 | Staniforth |
| 5,317,799 A | 6/1994 | Chapman et al. |
| 6,257,628 B1 | 7/2001 | Nijsen |
| 6,322,273 B1 | 11/2001 | Gentile, Jr. |
| 6,533,331 B2 | 3/2003 | Hulsebos et al. |

(Continued)

FOREIGN PATENT DOCUMENTS

| JP | 61-88091 | 5/1986 |
| JP | 7-253183 | 10/1995 |

(Continued)

*Primary Examiner* — David E Bochna

(74) *Attorney, Agent, or Firm* — Knobbe Martens Olson & Bear LLP (57) ABSTRACT

A separation prevention device for a pipe joint has disengagement prevention members and a press member. The disengagement prevention members are disposed at a plurality of locations in a circumferential direction of the pipe, on an inner peripheral surface of an engaging tool or of a receiving opening itself and which are formed with claws. The press member presses the disengagement prevention member radially inward of the pipe and which engages the claw with the outer peripheral surface of an inserting opening. The claw of the disengagement prevention member and the claw of the disengagement prevention member which is adjacent to the former disengagement prevention member in the circumferential direction of the pipe are arranged so as to overlap on each other in the axial direction of the pipe in a state where the claws are engaged with the outer peripheral surface of the inserting opening.

9 Claims, 6 Drawing Sheets

U.S. PATENT DOCUMENTS

| | | |
|---|---|---|
| 6,786,517 B2 | 9/2004 | Shumard |
| 6,843,514 B2 | 1/2005 | Rex et al. |
| 7,185,924 B1 | 3/2007 | Longacre et al. |
| 7,266,875 B2 * | 9/2007 | Longacre et al. ............... 29/446 |
| 7,789,431 B2 | 9/2010 | Freudendahl |

FOREIGN PATENT DOCUMENTS

| | | |
|---|---|---|
| JP | 2003-329180 | 11/2003 |
| JP | 2004-301212 | 10/2004 |
| JP | 2005-3207 | 1/2005 |

* cited by examiner

SEPARATION PREVENTION DEVICE FOR PIPE JOINT

CROSS-REFERENCE TO RELATED APPLICATIONS

This application is a continuation of U.S. application Ser. No. 12/663,632, filed on Dec. 8, 2009 as the U.S. National Phase under 35. U.S.C. §371 of International Application PCT/JP2008/056539, filed Apr. 2, 2008, which claims priority to Japanese Patent Application No. 2007-155315, filed Jun. 12, 2007, Which are hereby incorporated by reference in their entirety.

TECHNICAL FIELD

The present invention relates to a separation prevention device for a pipe joint which prevents a receiving opening and an inserting opening inserted into and connected to the receiving opening from separating from each other in an axial direction thereof.

BACKGROUND ART

As such a separation prevention device for a pipe joint, there is known a separation prevention device including disengagement prevention members disposed at a plurality of locations in a circumferential direction of the pipe on an inner peripheral surface of an engaging tool which engages with a receiving opening or an inner peripheral surface of the receiving opening itself, and a press member which presses the disengagement prevention members inward in the radial direction of the pipe, as disclosed in Patent Documents 1 and 2. A claw is formed on the inner peripheral surface of the disengagement prevention member. The disengagement prevention member is pressed by the press member, the claw is made to bite into an outer peripheral surface of the inserting opening and engage with the outer peripheral surface, thereby exhibiting a separation preventing effect against a separating force of the receiving opening and the inserting opening in the axial direction of the pipe.

Figure 11:
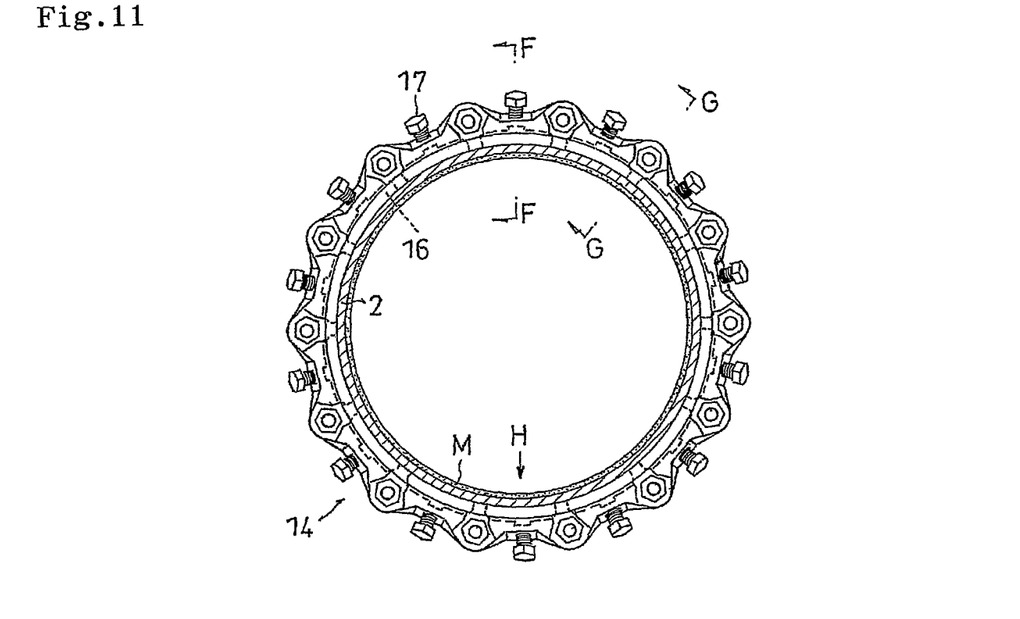
FIG. 11 is a sectional front view showing one example of a conventional separation prevention device for a pipe joint.
Figure 12:
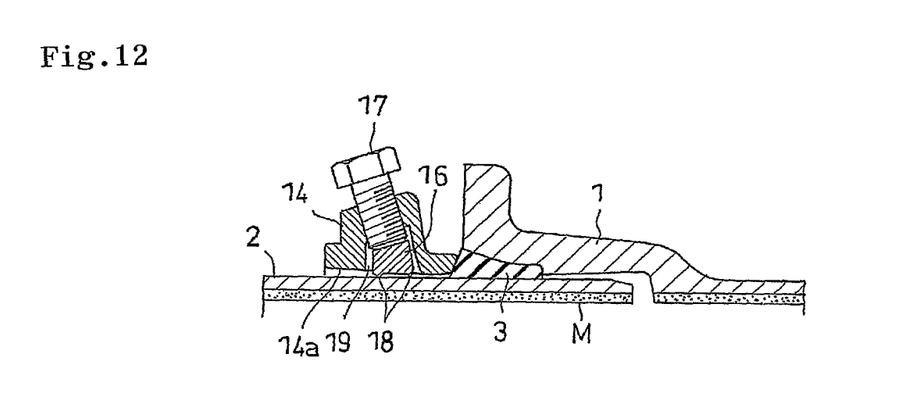
FIG. 12 is a cross sectional view as seen from an arrow F-F in FIG. 11.
Figure 13:
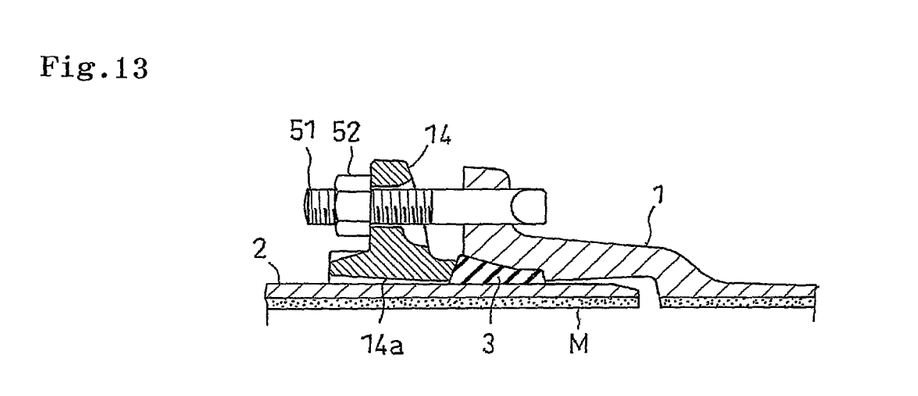
FIG. 13 is a cross sectional view as seen from an arrow G-G in FIG. 11.

One example of the conventional separation prevention device of a pipe joint will be described with reference to FIGS. 11 to 15. The same reference numerals are attached to the same members and positions as the members and positions described in a first embodiment according to the present invention mentioned below, and an overlapping description will not be repeated. As shown in FIGS. 11 to 13, a pressing ring 14 is engaged with a receiving opening 1 in a state where the pressing ring 14 is fitted over an inserting opening 2, the pressing ring 14 presses a seal material 3 inserted into the receiving opening 1 and compresses the seal material 3 to a sealed state. FIG. 12 is a cross sectional view as seen from an arrow F-F in FIG. 11. FIG. 13 is a cross sectional view as seen from an arrow G-G in FIG. 11

Figure 14:
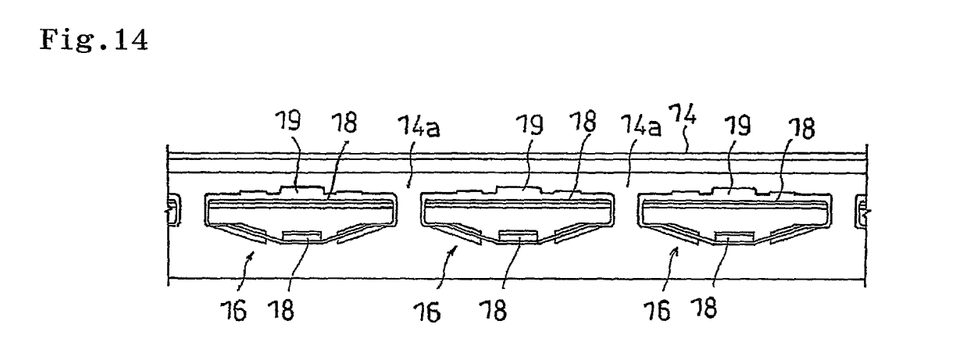
FIG. 14 is a development view of an inner peripheral surface of a pressing ring as viewed from the direction of an arrow H in FIG. 11.

FIG. 14 is a development view of the inner peripheral surface of the pressing ring 14 as viewed from the direction of an arrow H in FIG. 11. Recesses 19 are formed at a plurality of locations in an inner peripheral surface 14a of the pressing ring 14 at equal distances from one another in the circumferential direction of the pipe. The recesses 19 open toward the inserting opening 2. A disengagement prevention member 16 having a claw 18 is accommodated in each of the recesses 19. A screw hole is formed in each of the recesses 19 radially outward of the pipe, and a pressing bolt 17 as the press member is threadedly engaged with the screw hole. The separation preventing effect of the pipe joint is exhibited by operating the pressing bolt 17 to press the disengagement prevention member 16 radially inward of the pipe, and by making the claws 18 bite into and engage with the outer peripheral surface of the inserting opening 2.

Figure 15:
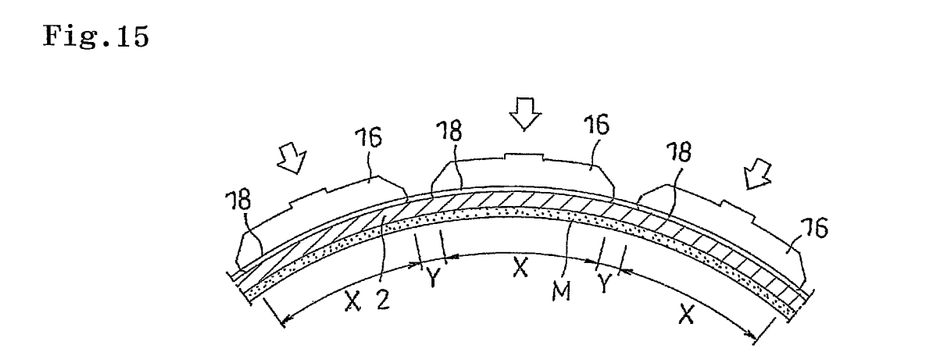
FIG. 15 is a diagram used for describing contact regions and non-contact regions of a claw.

According to the separation prevention device, however, it was found that when the claws 18 of the disengagement prevention members 16 were made to bite into and engage with the outer peripheral surface of the inserting opening 2 as shown in FIG. 15, in a material limit region where a pipe is deformed, stress concentration occurred due to pipe deformation in a non-contact region Y formed between contact regions X of the claw, and a crack was generated in a lining layer M of the inner peripheral surface of the pipe in some cases. The crack is frequently generated especially at a central portion of the non-contact region Y. It is conceived that this is because a shearing stress generated near ends of the claws 18 which are adjacent to each other in the circumferential direction of the pipe acts on the lining layer M at the central portion of the non-contact region Y.

In the separation prevention device in which the disengagement prevention members are disposed at the plurality of locations in the circumferential direction of the pipe, since a ratio of a length of the contact region of the claw in the circumferential direction of the pipe with respect to the outer peripheral surface of the inserting opening is about 80 to 90% at most, in order to enhance the separation preventing effect, there is room for improvement of the rate. Particularly, there is a tendency that it is difficult to prevent the separation against strong external forces caused by an earthquake or differential settlement, and it is strongly desired to propose a technique for improving this.

Patent Document 1: Japanese Unexamined Patent Publication No. 61-88091

Patent Document 2: Japanese Unexamined Patent Publication No. 2005-3207

DISCLOSURE OF THE INVENTION

Problems to be Solved by the Invention

The present invention has been accomplished in view of the above circumstances, and it is an object of the present invention to provide a separation prevention device for a pipe joint capable of preventing a lining layer of an inner peripheral surface of a pipe from being damaged, and capable of enhancing separation preventing effect.

Means for Solving the Problems

The object can be achieved by the following present invention. That is, the present invention provides a separation prevention device for a pipe joint which prevents a receiving opening and an inserting opening which is inserted into and connected to the receiving opening from being separated from each other in an axial direction of the pipe, comprising disengagement prevention members which are disposed at a plurality of locations in a circumferential direction of the pipe, on an inner peripheral surface of an engaging tool which is engaged with the receiving opening in a state where the receiving opening is fitted over the inserting opening or on an inner peripheral surface of the receiving opening itself, and which is formed with claws capable of biting into an outer peripheral surface of the inserting opening and a press member which presses the disengagement prevention member radially inward of the pipe and which engages the claw with the outer peripheral surface of the inserting opening, wherein the claw of the disengagement prevention member and the claw of the disengagement prevention member which is adjacent to the former disengagement prevention member in the circumferential direction of the pipe are arranged so as to overlap on each other in the axial direction of the pipe in a state where the claws are engaged with the outer peripheral surface of the inserting opening.

According to the separation prevention device for a pipe joint of the present invention, the claw of the disengagement prevention member and the claw of the disengagement prevention member which is adjacent to the former disengagement prevention member in the circumferential direction of the pipe are arranged so as to overlap on each other in the axial direction of the pipe in a state where the claws are engaged with the outer peripheral surface of the inserting opening. Therefore, the contact region of the claws can be continuous in the circumferential direction of the pipe between the adjacent disengagement prevention members. Therefore, stress concentration caused by deformation of the pipe when the claw bites into and engages with the outer peripheral surface of the inserting opening can be suppressed, and it is possible to avoid damage such as a crack in the lining layer. Further, according to the present invention, since the claws of the adjacent disengagement prevention members are disposed as described above, the ratio of the length of the contact region of the claw in the circumferential direction of the pipe with respect to the outer peripheral surface of the inserting opening can be increased. Accordingly, a separation preventing effect can be appropriately exhibited against a strong external force caused by an earthquake or differential settlement.

In the present invention, it is preferable that the disengagement prevention members disposed at the plurality of locations in the circumferential direction of the pipe are accommodated in an annular groove which opens toward the inserting opening in the inner peripheral surface of the engaging tool or the receiving opening itself. With this structure, the disengagement prevention members can be collectively accommodated in the annular groove, and the structure can be simplified as compared with the conventional case in which the disengagement prevention members are separately accommodated in recesses.

In the above structure, it is preferable that the two claws extending in the circumferential direction of the pipe are formed on the inner peripheral surface of the disengagement prevention member, and one of the claws is disposed at a distance from the other claw in the axial direction of the pipe and whose both ends are deviated in position in the circumferential direction of the pipe. With this structure, engaging effect of the claw with respect to the outer peripheral surface of the inserting opening can be exhibited stably, and the claws can be appropriately disposed such that they are overlapped on each other in the axial direction of the pipe between the disengagement prevention members which are adjacent in the circumferential direction of the pipe.

In the above structure, it is preferable that a contact region of the claw can be formed on the entire region of the inserting opening in the circumferential direction of the pipe. With this structure, damage such as a crack in the lining layer can be avoided over the entire region in the inserting opening of the circumferential direction of the pipe, and the separation preventing effect can be appropriately enhanced.

DESCRIPTION OF THE REFERENCE SYMBOLS

1 Receiving opening
2 Inserting opening
3 Seal material
4 Pressing ring (engaging tool)
5 Fastening tool
6 Disengagement prevention member
7 Pressing bolt (press member)
8 Claw
9 Annular groove
10 Overlapped portion
P Fluid pipe
X Contact region of claw

BEST MODE FOR CARRYING OUT THE INVENTION

Embodiments of the present invention will be explained with reference to the drawings.

First Embodiment

Figure 1:
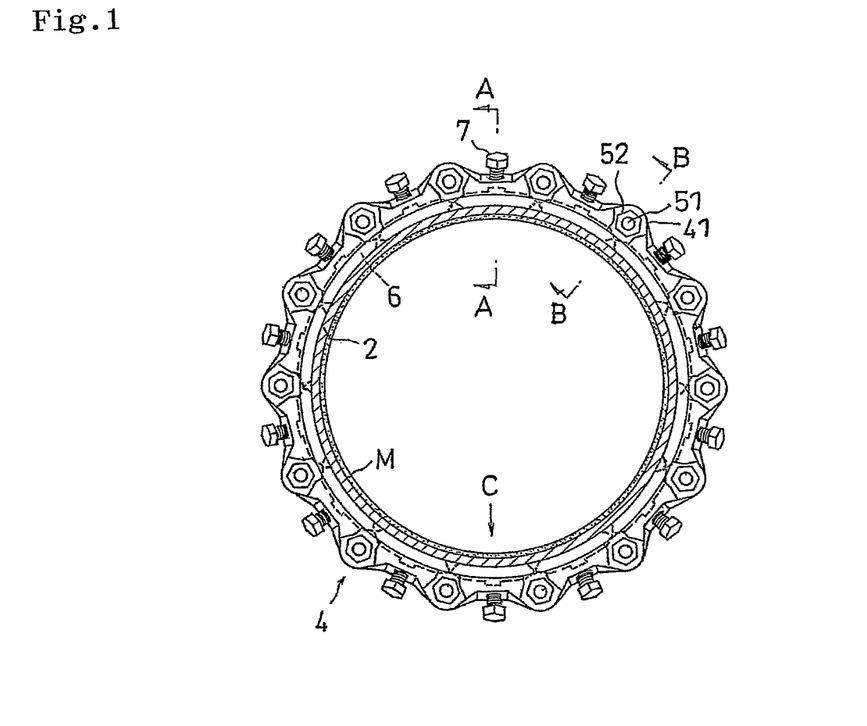
FIG. 1 is a sectional front view showing a first embodiment of a separation prevention device for a pipe joint of the present invention.
Figure 2:
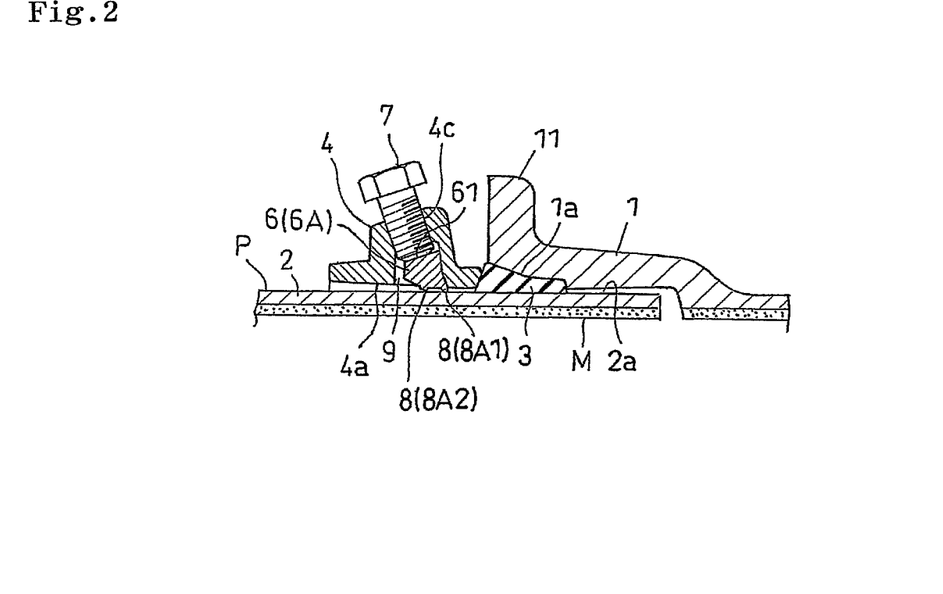
FIG. 2 is a cross sectional view as seen from an arrow A-A in FIG. 1.
Figure 3:
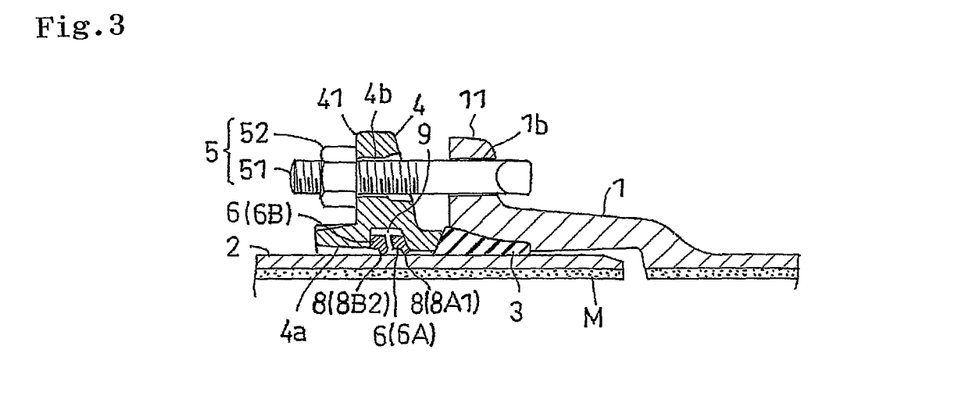
FIG. 3 is a cross sectional view as seen from an arrow B-B in FIG. 1.

FIG. 1 is a sectional front view showing a first embodiment of a separation prevention device for a pipe joint of the present invention. FIG. 2 is a cross sectional view as seen from an arrow A-A in FIG. 1. FIG. 3 is a cross sectional view as seen from an arrow B-B in FIG. 1. In a pipe joint of fluid pipes P such as water pipes, gas pipes and plant pipes, the separation prevention device prevents a receiving opening 1 of one of the fluid pipes P and an inserting opening 2 of the other fluid pipe P inserted into and connected to the receiving opening 1 from separating from each other in an axial direction of the pipe (direction perpendicular to a sheet plane of FIG. 1).

An annular seal material 3 is disposed on a pipe joint of the fluid pipes P. The seal material 3 can seal between an inner peripheral surface 1a of the receiving opening 1 and an outer peripheral surface 2a of the inserting opening 2. The seal material 3 is pressed by a cast-iron pressing ring 4 (corresponding to the engaging tool) from the axial direction of the pipe, and is compressed such that an appropriate sealed state (water-tight state if the pipe is a water pipe) is obtained. A synthetic rubber such as styrene-butadiene rubber is shown as the seal material 3.

The pressing ring 4 can be fitted over the inserting opening 2. As shown in FIG. 3, the pressing ring 4 is fitted over the inserting opening 2 and in this state, the pressing ring 4 is engaged with the receiving opening 1. The pressing ring 4 and the receiving opening 1 are engaged with each other by a fastening tool 5 which detachably fixes and connects the pressing ring 4 and the receiving opening 1 with each other from the axial direction of the pipe. The fastening tool 5 includes a T-head bolt 51 and a nut 52. The T-head bolt 51 is inserted through a bolt insertion hole 1b formed in a flange 11 of the receiving opening 1 and a bolt insertion hole 4b formed in a projection piece 41 of the pressing ring 4. The nut 52 is threadedly engaged with a screw shaft of the T-head bolt 51. The seal material 3 is compressed by relative approaching movement between the pressing ring 4 and the receiving opening 1 caused by the fastening operation of the T-head bolt 51 and the nut 52, and the above-described sealed state can be obtained.

Although the present embodiment shows an example where pressing ring 4 is of annular shape and is integrally formed, the present invention is not limited thereto, and it is possible to employ a split-type pressing ring in which two or more divided pieces are annularly assembled. An annular groove 9 opening toward the inserting opening 2 is formed in an inner peripheral surface 4a of the pressing ring 4, and metal disengagement prevention members 6 are accommodated in the annular groove 9. As shown in FIG. 1, the disengagement prevention members 6 are disposed at a plurality of locations (fourteen locations in the present embodiment) in the circumferential direction of the pipe. Claws 8 capable of biting into the outer peripheral surface 2a of the inserting opening 2 are formed on the inner peripheral surface of the disengagement prevention members 6.

A screw hole 4c penetrating an outer peripheral wall of the annular groove 9 is formed in a central portion of each of the disengagement prevention members 6 in its circumferential direction radially outward. A pressing bolt 7 (corresponding to the press member) is threadedly engaged with each of the screw holes 4c from outside in the radial direction of the pipe. In this manner, by operating the pressing bolt 7, the disengagement prevention member 6 can be pressed radially inward of the pipe, and the claws 8 can bite into and engage with the outer peripheral surface 2a of the inserting opening 2.

An inclined surface 61 whose diameter becomes greater toward the receiving opening 1 is formed on a central portion of an outer surface of the disengagement prevention member 6 in the circumferential direction. The pressing bolt 7 inclines with respect to a direction perpendicular to the axial direction of the inserting opening 2 so as to press the disengagement prevention member 6 through the inclined surface 61. Therefore, when an external force separating the receiving opening 1 and the inserting opening 2 from each other in the axial direction of the pipe is applied, the disengagement prevention member 6 is pressed radially inward of the pipe by wedge effect, and engaging effect caused by the claws 8 can be enhanced.

Figure 4:
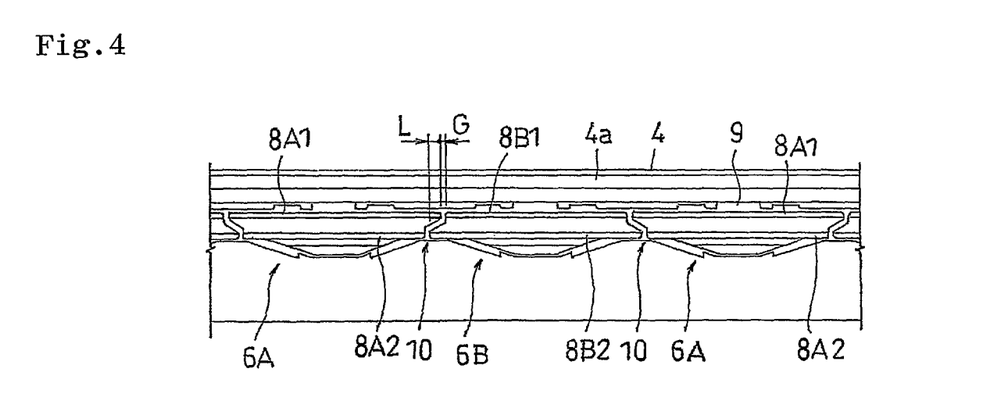
FIG. 4 is a development view of an inner peripheral surface of a pressing ring as viewed from the direction of an arrow C in FIG. 1.
Figure 5:
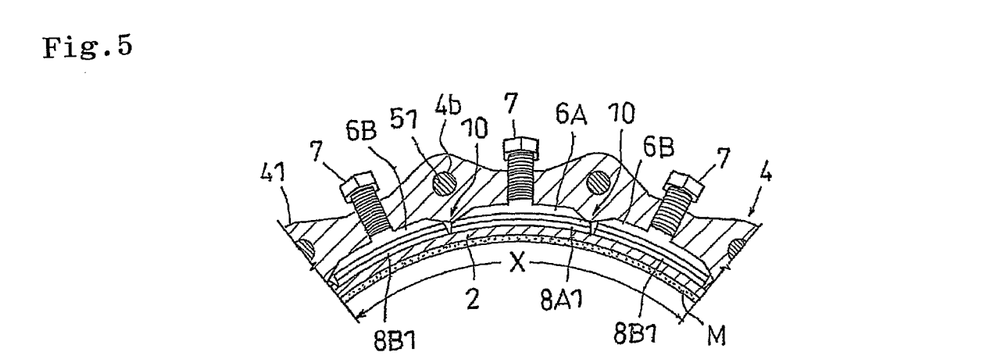
FIG. 5 is a diagram of disengagement prevention members and pressing bolts as viewed from a receiving opening along an axial direction of a pipe.

FIG. 4 is a development view of the inner peripheral surface 4a of the pressing ring 4 as viewed from the direction of an arrow C in FIG. 1. An upper side in FIG. 4 is on the side of the receiving opening 1. FIG. 5 is a diagram of the disengagement prevention members 6 and the pressing bolts 7 as viewed from the receiving opening 1 side along the axial direction of the pipe. In the present embodiment, two kinds of disengagement prevention members, i.e., disengagement prevention members 6A and disengagement prevention members 6B are employed as the disengagement prevention members 6, and they are disposed alternately adjacent to each other in the circumferential direction of the pipe.

Two claws 8A1 and 8A2 continuously extending in the circumferential direction of the pipe are integrally formed on the inner peripheral surface of the disengagement prevention member 6A as the claws 8. The claws 8A1 and 8A2 project so as to form triangular cross sections as shown in FIG. 2, and are disposed in parallel to each other at a predetermined distance from each other in the axial direction of the pipe. Similarly, two claws 8B1 and 8B2 are also formed on the inner peripheral surface of the disengagement prevention member 6B, the claw 8B1 is disposed at the same position as the claw 8A1 in the axial direction of the pipe, and the claw 8B2 is disposed at the same position as the claw 8A2 in the axial direction of the pipe. A tip end of the claw 8 is curved in an arc form as viewed in the axial direction of the pipe, and a curvature thereof is set such that it is substantially the same as that of the outer peripheral surface 2a of the inserting opening 2.

Both ends of one of the two claws of the disengagement prevention members 6A and 6B are deviated in the circumferential direction of the pipe from both ends of the other claw. More specifically, the claw 8A1 of the disengagement prevention member 6A is longer than the claw 8A2, and the claw 8A1 protrudes from both ends of the claw 8A2 in the circumferential direction of the pipe. The claw 8B2 of the disengagement prevention member 6B is longer than the claw 8B1, and the claw 8B2 protrudes from both ends of the claw 8B1 in the circumferential direction of the pipe. The claw 8A1 of the disengagement prevention member 6A and the claw 8B2 of the disengagement prevention member 6B are overlapped on each other in the axial direction of the pipe, and an overlapped portion 10 is formed.

In this manner, as shown in FIG. 5, a contact region X of the claw 8 can continuously be formed in the circumferential direction of the pipe between the adjacent disengagement prevention members 6A and 6B, stress concentration caused by deformation of the pipe at the inserting opening 2 can be suppressed, and damage such as a crack in a lining layer M of the inner peripheral surface of the pipe can be prevented. Further, the ratio of the length of the contact region X of the claw 8 in the circumferential direction of the pipe with respect to the outer peripheral surface 2a of the inserting opening 2 is increased. Accordingly, a separation preventing effect can be appropriately exhibited against a strong external force caused by an earthquake or differential settlement.

In the present invention, to exhibit the damage preventing effect of the lining layer M over the entire region of the inserting opening 2 in the circumferential direction of the pipe, and to further enhance the separation preventing effect of the pipe joint, it is preferable that the overlapped portion 10 is formed between all of the disengagement prevention members 6A and the disengagement prevention members 6B, and the contact region X of the claw 8 is formed over the entire region of the inserting opening 2 in the circumferential direction of the pipe. In such a case, a ratio of the length of the contact region X of the claw 8 in the circumferential direction of the pipe with respect to the outer peripheral surface 2a of the inserting opening 2 is 100%.

A state where the above-described overlapped portion 10 is formed may be obtained when the claws 8 of the disengagement prevention members 6A and 6B are engaged with the outer peripheral surface 2a of the inserting opening 2. Since a moving stroke of the disengagement prevention member 6 in the radial direction of the pipe is usually a few millimeters due to the structure of the pressing ring 4, the overlapped portion 10 may already be formed before the disengagement prevention members 6A and 6B are pressed as in the present embodiment.

To appropriately form the overlapped portion 10 and reliably exhibit the above-described effect, in the present invention, it is preferable to increase the length L of the overlapped portion 10 in the circumferential direction of the pipe as long as possible within a range where the strength with respect to a load can be obtained, and the length L of the overlapped portion 10 in the present embodiment is exemplified in a range of 5 to 8 mm. A gap G between the claws 8 which are adjacent in the circumferential direction of the pipe is not particularly limited, but in the present embodiment, an example of the gap is in a range of 1 to 3 mm in a state where the claws 8 are engaged with the outer peripheral surface 2a of the inserting opening 2.

In the present embodiment, as shown in FIG. 4, portions where the claws 8A1 and 8A2 are formed at both ends of the inner peripheral surface of the disengagement prevention member 6A in the circumferential direction of the pipe are provided substantially in parallel to the axial direction of the pipe, and portions located between these former portions are inclined with respect to the axial direction of the pipe. In this manner, the thicknesses of the both ends of the claws 8A1 and 8A2 are secured, and the engaging effect to the outer peripheral surface 2a of the inserting opening 2 can effectively be exhibited. The disengagement prevention member 6B has the same structure and can exhibit the same effect.

In the present embodiment, the plurality of disengagement prevention members is collectively accommodated in one annular groove 9. Therefore, the structure of the pressing ring can be simplified as compared with the conventional case where the disengagement prevention members are separately accommodated in the recesses.

Second Embodiment

In the first embodiment, the separation prevention device for a pipe joint of the present invention is applied to a so-called mechanical pipe joint in which the pressing ring and the receiving opening are formed relatively close to each other, thereby compressing the seal material to establish a sealed state. However, the present invention is not limited thereto, and the separation prevention device may be applied to a so-called slip-on pipe joint in which the receiving opening has a self-sealing function. An example in which the separation prevention device of the present invention is applied to the slip-on pipe joint will be described.

Figure 6:
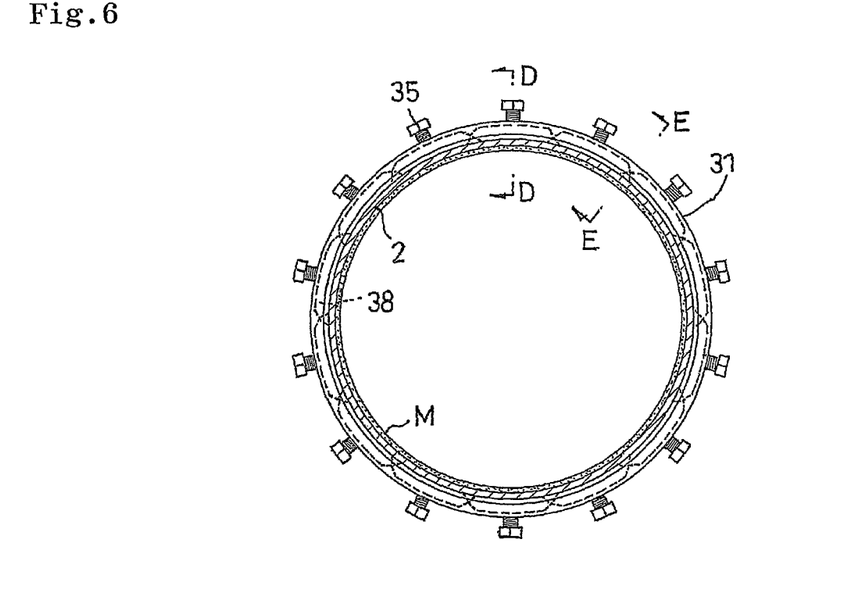
FIG. 6 is a sectional front view showing a second embodiment of a separation prevention device for a pipe joint of the present invention.
Figure 7:
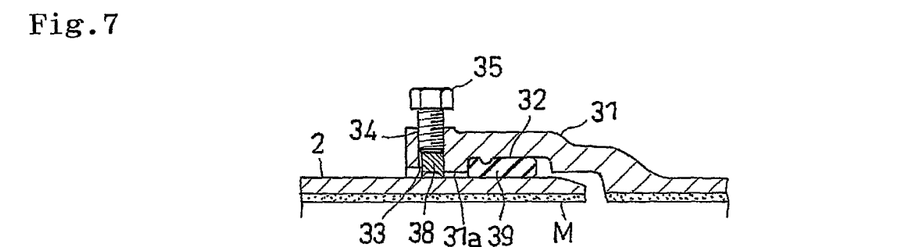
FIG. 7 is a cross sectional view as seen from an arrow D-D in FIG. 6.
Figure 8:
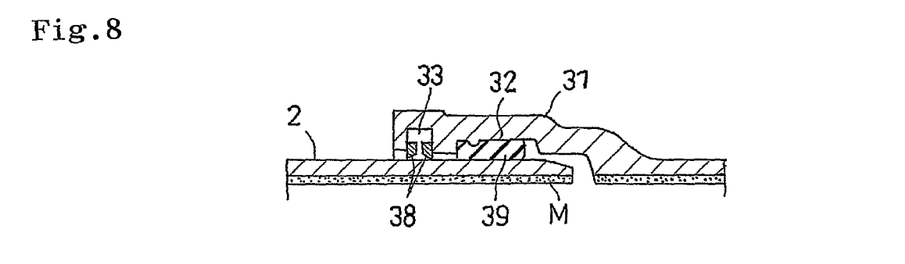
FIG. 8 is a cross sectional view as seen from an arrow E-E in FIG. 6.

FIG. 6 is a sectional front view showing a second embodiment of a separation prevention device for a pipe joint of the present invention. FIG. 7 is a cross sectional view as seen from an arrow D-D in FIG. 6. FIG. 8 is a cross sectional view as seen from an arrow E-E in FIG. 6. Since a second embodiment has similar structure and operation to the first embodiment excluding a structure explained below, portions of the second embodiment which are common to those of the first embodiment will not be repeated here, and different portions will mainly be explained.

In the second embodiment, disengagement prevention members 6 are disposed at a plurality of locations on an inner peripheral surface of a receiving opening 31 itself in the circumferential direction of the pipe. The inner peripheral surface 31a of the receiving opening 31 is provided with an annular recess 32 for accommodating a seal material 39 therein, and an annular groove 33 which is located closer to a tip end than the annular recess 32 and which opens toward the inserting opening 2. A disengagement prevention member 38 is accommodated in the annular groove 33. Screw holes 34 penetrating an outer peripheral wall of the annular groove 33 are formed in a central portion of the disengagement prevention member 38 in the circumferential direction thereof at locations radially outward of the pipe. Pressing bolts 35 are inserted into the screw holes 34, respectively in a direction perpendicular to the axis of the inserting opening 2. The same structure as that of the disengagement prevention member 6 described in the first embodiment can be employed for the disengagement prevention member 38.

According to this structure, by operating the pressing bolt 35 to press the disengagement prevention member 38 radially inward of the pipe, the claws of the disengagement prevention members 38 can bite into the outer peripheral surface of the inserting opening 2. At that time, the contact regions of the claws are continuously formed in the circumferential direction of the pipe between the adjacent disengagement prevention members 38, similar to the first embodiment. Therefore, it is possible to prevent the lining layer M from being damaged, and to exhibit excellent separation preventing effect of the pipe joint.

Other Embodiments (1) The present invention is not limited to the above-described embodiments, and various changes may be made without departing from the subject matter of the present invention. A projecting amount, a cross section shape, a curvature of the claw, a length of the disengagement prevention member in the circumferential direction of the pipe can appropriately be changed. Although the disengagement prevention members are disposed at fourteen locations in the circumferential direction of the pipe in the above-described embodiment, the present invention is not limited thereto, and the disengagement prevention members may be disposed at four to twenty eight locations in the circumferential direction of the pipe.

(2) The pressing bolt as the press member is inclined with respect to or in parallel to the direction perpendicular to the axial direction of the inserting opening in the above-described embodiment, the present invention is not limited thereto, and the pressing bolt may be provided in parallel to the axial direction of the pipe. For example, it is possible to employ such a structure that a side surface of the tip end of the pressing bolt is tapered, the tapered surface is disposed such that it can come into contact with the outer peripheral surface of the disengagement prevention member, and the pressing bolt is made to move forward, thereby pressing the disengagement prevention member radially inward of the pipe.

Figure 9:
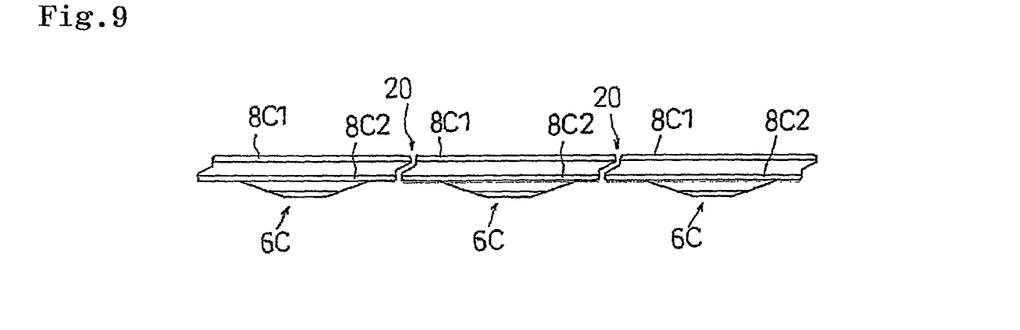
FIG. 9 is a plan view showing an inner peripheral surface of disengagement prevention members according to another embodiment of the present invention.

(3) Although the both ends of one of the two claws of the disengagement prevention member project more than the other claw in the circumferential direction of the pipe in the above-described embodiment, the present invention is not limited thereto. In the case of a disengagement prevention member 6C shown in FIG. 9, a right end of the claw 8C1 shown in FIG. 9 projects more than the claw 8C2 in the circumferential direction of the pipe, a left end of the claw 8C2 in FIG. 9 projects more than the claw 8C1 in the circumferential direction of the pipe, the claw 8C1 of the disengagement prevention member 6C and the claw 8C2 thereof which is adjacent to the claw 8C1 are overlapped on each other in the axial direction of the pipe, thereby forming an overlapped portion 20. In this case, since one kind of disengagement prevention member 6C suffices, the number of parts can be reduced.

Figure 10:
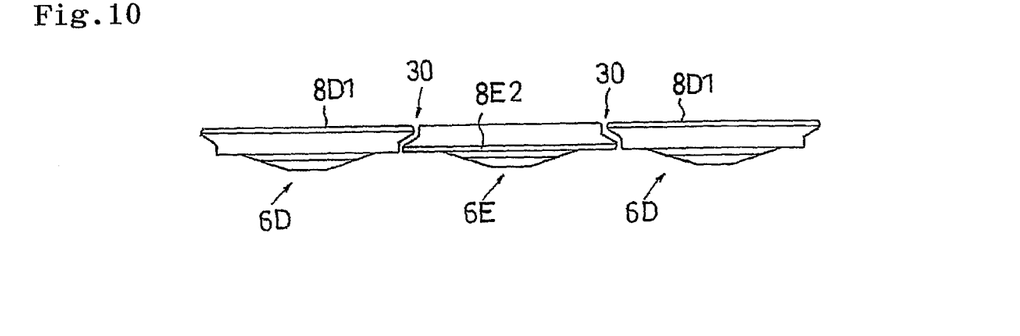
FIG. 10 is a plan view showing an inner peripheral surface of disengagement prevention members according to another embodiment of the present invention.

(4) Although the two claws are formed on the disengagement prevention member in the above-described embodiment, the number of claws is not limited thereto, and the number thereof may be one, three or more. FIG. 10 shows an example in which one claw is formed on the disengagement prevention members 6D and 6E. A claw 8D1 of the disengagement prevention member 6D is overlapped on a claw 8E2 of the disengagement prevention member 6E in the axial direction of the pipe, and thereby an overlapped portion 30 is formed.

What is claimed is:

1. A separation prevention method for a pipe joint, that connects a first pipe having a receiving opening and a second pipe having an inserting opening, comprising:

fitting an engaging tool over the second pipe, said engaging tool comprising a plurality of disengagement prevention members disposed at a plurality of locations in a circumferential direction, such that claws formed on the disengagement prevention member face an outer peripheral surface of the inserting opening, and a claw of at least one of the disengagement prevention members and a claw of an adjacent disengagement prevention member, which is adjacent in the circumferential direction of the pipe, are arranged so as to overlap each other when viewed in an axial direction of the pipe in a state where the claws are engaged with the outer peripheral surface of the inserting opening;

inserting the inserting opening of the second pipe into the receiving opening of the first pipe;

engaging the engaging tool with the first pipe; and pressing the disengagement prevention members radially inward of the pipe joint, wherein the disengagement prevention members disposed at the plurality of locations in the circumferential direction of the pipe are accommodated in an annular groove which opens toward the inserting opening in the inner peripheral surface of the engaging tool or the receiving opening itself.

2. The separation prevention method according to claim 1, wherein a contact region of the claw is formed on an entire region of the inserting opening in the circumferential direction of the pipe joint.

3. The separation prevention method according to claim 1, wherein the disengaging prevention member has an inclined surface and said disengagement prevention member is pressed on the inclined surface, whereby the disengagement prevention member is pressed radially inward of the pipe joint by wedge effect so as to enhance an engagement effect caused by the claws, when an external force separating the first pipe and the second pipe from each other in the axial direction of the pipe joint is applied.

4. A separation prevention method for a pipe joint, that connects a first pipe having a receiving opening and a second pipe having a inserting opening, comprising:

inserting the inserting opening of the second pipe into the receiving opening of the first pipe, said first pipe comprising a plurality of disengagement prevention members disposed at a plurality of locations in a circumferential direction, such that claws formed on the disengagement prevention member face an outer peripheral surface of the inserting opening, and a claw of at least one the disengagement prevention members and a claw of an adjacent disengagement prevention member, which is adjacent in the circumferential direction of the pipe, are arranged so as to overlap each other when viewed in an axial direction of the pipe in a state where the claws are engaged with the outer peripheral surface of the inserting opening; and pressing the disengagement prevention members radially inward of the pipe joint, wherein the first pipe comprise an annular groove on the inner peripheral surface at the receiving opening which opens in a direction radially inward of the first pipe, and the disengagement preventers are disposed at the plurality of locations therein.

5. The separation prevention method according to claim 4, wherein a contact region of the claw is formed on an entire region of the inserting opening in the circumferential direction of the pipe joint.

6. The separation prevention method according to claim 4, wherein the disengaging prevention member has an inclined surface and said disengagement prevention member is pressed on the inclined surface, whereby the disengagement prevention member is pressed radially inward of the pipe joint by wedge effect so as to enhance an engagement effect caused by the claws, when an external force separating the first pipe and the second pipe from each other in the axial direction of the pipe joint is applied.

7. A plurality of disengagement prevention members which are disposed at a plurality of locations in a circumferential direction of a pipe, each disengagement prevention member comprising a claw capable of biting into an outer peripheral surface of the pipe, wherein the claw of at least one of the disengagement prevention members and a claw of an adjacent disengagement prevention member, which is adjacent in the circumferential direction of the pipe, are arranged so as to overlap each other to form an overlapped portion when viewed in an axial direction of the pipe in a state where the claws are engaged with the outer peripheral surface of the pipe, wherein portions of both ends of the inner peripheral surface of each of the disengagement prevention members in the circumferential direction of the pipe where the claws are formed are provided substantially in parallel to the axial direction of the pipe.

8. A plurality of the disengagement prevention members according to claim 7, wherein the overlapped portion in which the claws are overlapped with each other viewed in the axial direction of the pipe is formed at all of locations where the disengagement prevention members are adjacent to each other in the circumferential direction of the pipe.

9. A plurality of the disengagement prevention members according to claim 7, wherein two of the claws extending in the circumferential direction of the pipe are formed on an inner peripheral surface of each of the disengagement prevention members, and one of the claws is disposed at a distance from the other claw in the axial direction of the pipe and whose both ends are deviated in position in the circumferential direction of the pipe.

* * * * *